(12) United States Patent
Huang et al.

(10) Patent No.: US 12,026,254 B2
(45) Date of Patent: Jul. 2, 2024

(54) PREDICTION MODEL SELECTION FOR CYBER SECURITY

(71) Applicant: Optum, Inc., Minnetonka, MN (US)

(72) Inventors: Ziqian Huang, Buffalo Grove, IL (US);
Matthew H. Murphy, Pendleton, SC (US); Michael J. Levin, Arlington, VA (US); William Casey, Richmond, VA (US)

(73) Assignee: OPTUM, INC., Minnetonka, MN (US)

( * ) Notice: Subject to any disclaimer, the term of this patent is extended or adjusted under 35 U.S.C. 154(b) by 115 days.

(21) Appl. No.: 17/807,578

(22) Filed: Jun. 17, 2022

(65) Prior Publication Data

US 2023/0409703 A1 Dec. 21, 2023

(51) Int. Cl.
*G06F 21/55* (2013.01)
*G06F 21/56* (2013.01)

(52) U.S. Cl.
CPC .......... *G06F 21/554* (2013.01); *G06F 21/566* (2013.01)

(58) Field of Classification Search
CPC .............................. G06F 21/554; G06F 21/566
USPC ........................................................ 726/22
See application file for complete search history.

(56) References Cited

U.S. PATENT DOCUMENTS

| | | | |
|---|---|---|---|
| 9,258,321 B2 | 2/2016 | Amsler et al. | |
| 10,417,528 B2 | 9/2019 | Ma et al. | |
| 2006/0178915 A1* | 8/2006 | Chao | G16H 20/10 705/14.1 |
| 2012/0173265 A1* | 7/2012 | Brush | G16H 50/30 705/2 |
| 2015/0326600 A1 | 11/2015 | Karabatis et al. | |
| 2018/0177483 A1* | 6/2018 | Ye | A61H 23/004 |
| 2019/0080416 A1* | 3/2019 | Smith | G06Q 40/08 |
| 2019/0318203 A1 | 10/2019 | Jou et al. | |
| 2020/0188697 A1* | 6/2020 | Kabrams | G16H 40/63 |
| 2020/0188698 A1* | 6/2020 | Kabrams | A61B 5/6814 |
| 2020/0188700 A1* | 6/2020 | Kabrams | A61B 5/0006 |
| 2020/0194120 A1* | 6/2020 | Kabrams | A61B 5/0006 |
| 2021/0133872 A1* | 5/2021 | Singh | G16H 10/60 |

(Continued)

FOREIGN PATENT DOCUMENTS

WO 2021105927 A1 6/2021

OTHER PUBLICATIONS

International Search Report and Written Opinion of International Application No. PCT/US2023/068528 dated Oct. 5, 2023, 6 pp.

(Continued)

*Primary Examiner* — Tauqir Hussain
(74) *Attorney, Agent, or Firm* — Shumaker & Sieffert, P.A.

(57) ABSTRACT

A method includes predicting, before a first period of time, a plurality of predicted event metric values and value ranges corresponding to a first plurality of events to occur over the first period of time based on a plurality of prediction models, determining an actual event metric value of the first plurality of events, and determining a plurality of model range multi-partition error (MRME) values indicative of an accuracy, precision, and relative range of the forecasting models based on the actual event metric values, value ranges, and the predicted event metric values. The method includes selecting one of the forecasting models based on the MRME values, determining a cyber security control limit based on a predicted event metric value or predicted event metric range by the selected forecasting model, and outputting an alert based on an actual event metric value being outside of the cyber security control limit.

20 Claims, 5 Drawing Sheets

(56) References Cited

U.S. PATENT DOCUMENTS

| | | | |
|---|---|---|---|
| 2021/0201209 A1 | 7/2021 | Sghiouer | |
| 2021/0304003 A1* | 9/2021 | Johnson | G06F 18/217 |
| 2021/0314333 A1 | 10/2021 | Krisiloff et al. | |
| 2021/0378585 A1* | 12/2021 | Daniele | A61B 5/7278 |
| 2022/0067832 A1* | 3/2022 | Singh | G06Q 40/04 |
| 2022/0117503 A1* | 4/2022 | Wang | A61B 5/14521 |
| 2022/0188700 A1 | 6/2022 | Khavronin et al. | |
| 2023/0165539 A1* | 6/2023 | Toth | A61B 5/4875 |
| | | | 600/301 |
| 2023/0309854 A1* | 10/2023 | Meeker | A61B 5/7405 |
| | | | 600/529 |

OTHER PUBLICATIONS

Bresnick, "What Is Deep Learning and How Will It Change Healthcare?", Health IT Analytics, Nov. 30, 2018, 12 pp., https://healthitanalytics.com/features/what-is-deep-learning-and-how-will-it-change-healthcare.

Disha et al., "Performance analysis of machine learning models for intrusion detection system using Gini Impurity-based Weighted Random Forest (GIWRF) feature selection technique", Cybersecurity, vol. 5, No. 1, Springer, Jan. 4, 2022, 22 pp., https://cybersecurity.springeropen.com/articles/10.1186/s42400-021-00103-8.

Jav, "How to plot actual vs. predicted values with a confidence interval on time series graph?", Stackoverflow, Mar. 6, 2016, 3 pp., https://stackoverflow.com/questions/35831464/how-to-plot-actual-vs-predicted-values-with-a-confidence-interval-on-time-serie.

Lean Six Sigma, "Six Sigma", 4 pp., Retrieved from the Internet on Oct. 5, 2022 from URL: https://www.leansixsigmadefinition.com/glossary/six-sigma/.

McNeese, "What is a Control Chart?", SPC for EXCEL, Feb. 13, 2019, 3 pp., https://www.spcforexcel.com/spc-blog/what-control-chart.

* cited by examiner

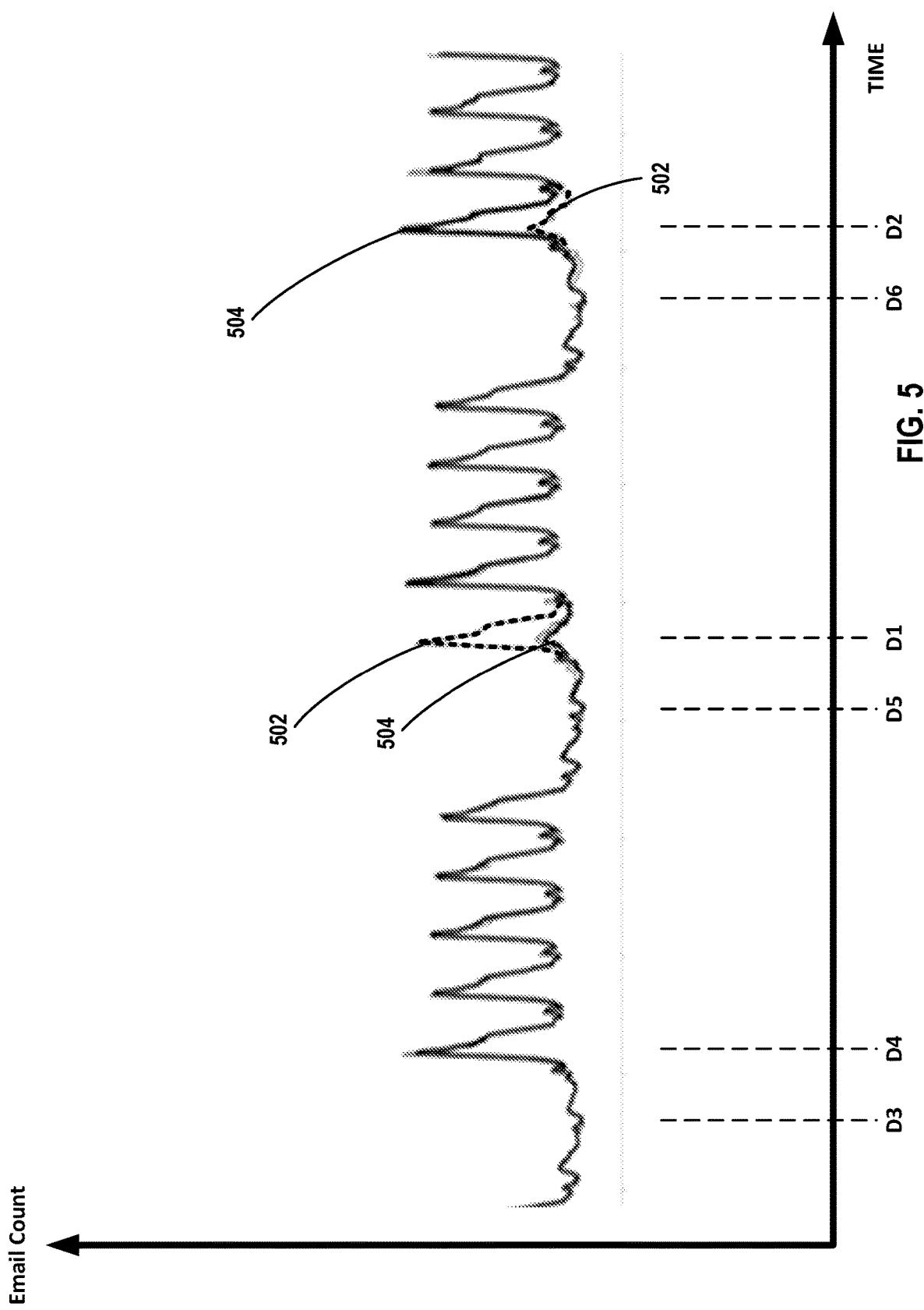

PREDICTION MODEL SELECTION FOR CYBER SECURITY

TECHNICAL FIELD

This disclosure relates to cyber security.

BACKGROUND

Cyber security systems and methods for monitoring against a wide range of attack patterns originating from a diverse set of attackers. Cyber security systems and methods may utilize visibility into machine-generated telemetry of operational data, and that operational data is often generated across many different technology platforms sometimes hosted in different networks, geographies, and support models. Systems, methods, and/or personnel tasked with monitoring the operational data may not be the same as the systems, methods, and/or personnel responsible for generating or transporting the operational data.

A part of identifying cyber security threats and/or problems in the generation or transport of operational data is cyber security baselining. Cyber security baselining and/or trend analysis can be used to monitor important metrics and generate metric benchmarks based on historical norms and drive business decisions.

SUMMARY

The present disclosure describes devices, systems, and methods for selecting a computer forecasting model from a plurality of computer forecasting models. The computer forecasting models may be configured to generate at least one predicted event metric value corresponding to a plurality of events, e.g., at least one baseline metric benchmark. An example method includes obtaining a plurality of events over a first period of time, determining a baseline value of at least one metric corresponding to the first plurality of events, and predicting one or more subsequent values of at least one metric corresponding to one or more subsequent plurality of events over one or more subsequent periods of time via the plurality of computer forecasting models. The example method further includes selecting a computer forecasting model from among the plurality of computer forecasting models based on a model range multi-partition error (MRME) value.

In some examples, the MRME criterion comprises a sum of a weighted prediction accuracy, a weighted prediction precision, and a weighted prediction relative range. For example, each forecasting model may predict upper and lower control limit values, e.g., a cyber security control limit, corresponding to the predicted event metric value, e.g., a predicted event metric value range, from which the weighted prediction accuracy, the weighted prediction precision and weighted prediction relative range may be determined. In some examples, each of the weighted prediction accuracy, weighted prediction precision, and weighted prediction relative range terms of the MRME value may have equal weights, and, in other examples, the weights of each of the prediction accuracy, precision, and relative range terms of the MRME value are determined and/or refined based on feedback corresponding to the one or more subsequent time periods. For example, the feedback may include a number of true positives, false positives, and false negatives generated by each of the plurality of forecasting models and an F-score of each of the forecasting models may be determined based on the number of true positives, false positives, and false negatives. The weights of the MRME may be changed, adjusted, refined, or the like, based on a maximum F-score. For example, the weights may be changed such that the forecasting model with the maximum F-score corresponds to the minimum MRME value.

In one example, this disclosure describes a method including: predicting, by a computing system and based on a first forecasting model and previous to a first period of time, a first predicted event metric value and a first predicted event metric value range of at least one event metric corresponding to a first plurality of events to occur over the first period of time; predicting, by the computing system and based on a second forecasting model and previous to the first period of time, a second predicted event metric value and a second predicted event metric value range of the at least one event metric corresponding to the first plurality of events to occur over the first period of time; obtaining, by the computing system, the first plurality of events over the first period of time; determining, by the computing system and based on the first plurality of events, a first actual event metric value of at least one event metric corresponding to the first plurality of events; determining, by the computing system, a first model range multi-partition error (MRME) value based on the first actual event metric value, the first predicted event metric value, and the first predicted event metric value range, wherein the first MRME value is indicative of an accuracy, precision, and relative range of the first forecasting model; determining, by the computing system, a second MRME value based on the first actual event metric value, the second predicted event metric value, and the second predicted event metric value range, wherein the second MRME value is indicative of an accuracy, precision, and relative range of the second forecasting model; selecting, by the computing system and based on the first and second MRME values, one of the first or second forecasting models to be a selected forecasting model, wherein a selected predicted event metric value is whichever of the first or second predicted event metric value that was predicted by the selected forecasting model, wherein a selected predicted event metric range is whichever of the first or second predicted event metric value range that was predicted by the selected forecasting model; determining, by the computing system, a cyber security control limit based on at least one of the selected predicted event metric value or the selected predicted event metric range; and outputting, by the computing system, a first alert based on the first actual event metric value being outside of the cyber security control limit.

In another example, this disclosure describes a computing system including: a communication unit configured to obtain a plurality of events; and one or more processors implemented in circuitry and in communication with the communication unit, the one or more processors configured to: predict, based on a first forecasting model and previous to a first period of time, a first predicted event metric value and a first predicted event metric value range of at least one event metric corresponding to a first plurality of events to occur over the first period of time; predict, based on a second forecasting model and previous to the first period of time, a second predicted event metric value and a second predicted event metric value range of the at least one event metric corresponding to the first plurality of events to occur over the first period of time; obtain the first plurality of events over the first period of time; determine, based on the first plurality of events, a first actual event metric value of at least one event metric corresponding to the first plurality of events; determine a first model range multi-partition error (MRME) value based on the first actual event metric value, the first predicted event metric value, and the first predicted event metric value range, wherein the first MRME value is indicative of an accuracy, precision, and relative range of the first forecasting model; determine a second MRME value based on the first actual event metric value, the second predicted event metric value, and the second predicted event metric value range, wherein the second MRME value is indicative of an accuracy, precision, and relative range of the second forecasting model; select based on the first and second MRME values, one of the first or second forecasting models to be a selected forecasting model, wherein a selected predicted event metric value is whichever of the first or second predicted event metric value that was predicted by the selected forecasting model, wherein a selected predicted event metric range is whichever of the first or second predicted event metric range that was predicted by the selected forecasting model; determine a cyber security control limit based on at least one of the selected predicted event metric value or the selected predicted event metric range; and output a first alert based on the first actual event metric value being outside of the cyber security control limit.

In another example, this disclosure describes a non-transitory computer-readable medium having instructions stored thereon that, when executed, cause one or more processors to: predict, based on a first forecasting model and previous to a first period of time, a first predicted event metric value and a first predicted event metric value range of at least one event metric corresponding to a first plurality of events to occur over the first period of time; predict, based on a second forecasting model and previous to the first period of time, a second predicted event metric value and a second predicted event metric value range of the at least one event metric corresponding to the first plurality of events to occur over the first period of time; obtain the first plurality of events over the first period of time; determine, based on the first plurality of events, a first actual event metric value of at least one event metric corresponding to the first plurality of events; determine a first model range multi-partition error (MRME) value based on the first actual event metric value, the first predicted event metric value, and the first predicted event metric value range, wherein the first MRME value is indicative of an accuracy, precision, and relative range of the first forecasting model; determine a second MRME value based on the first actual event metric value, the second predicted event metric value, and the second predicted event metric value range, wherein the second MRME value is indicative of an accuracy, precision, and relative range of the second forecasting model; select based on the first and second MRME values, one of the first or second forecasting models to be a selected forecasting model, wherein a selected predicted event metric value is whichever of the first or second predicted event metric value that was predicted by the selected forecasting model, wherein a selected predicted event metric range is whichever of the first or second predicted event metric range that was predicted by the selected forecasting model; determine a cyber security control limit based on at least one of the selected predicted event metric value or the selected predicted event metric range; and output a first alert based on the first actual event metric value being outside of the cyber security control limit.

The details of one or more examples are set forth in the accompanying drawings and the description below. Other features, objects, and advantages will be apparent from the description, drawings, and claims.

BRIEF DESCRIPTION OF THE DRAWINGS

FIG. 5 is a conceptual plot illustrating a plurality of events and predicted event metric values over a plurality of periods of time illustrating cyber security baselining in accordance with one or more aspects of this disclosure.

DETAILED DESCRIPTION

Figure 1:
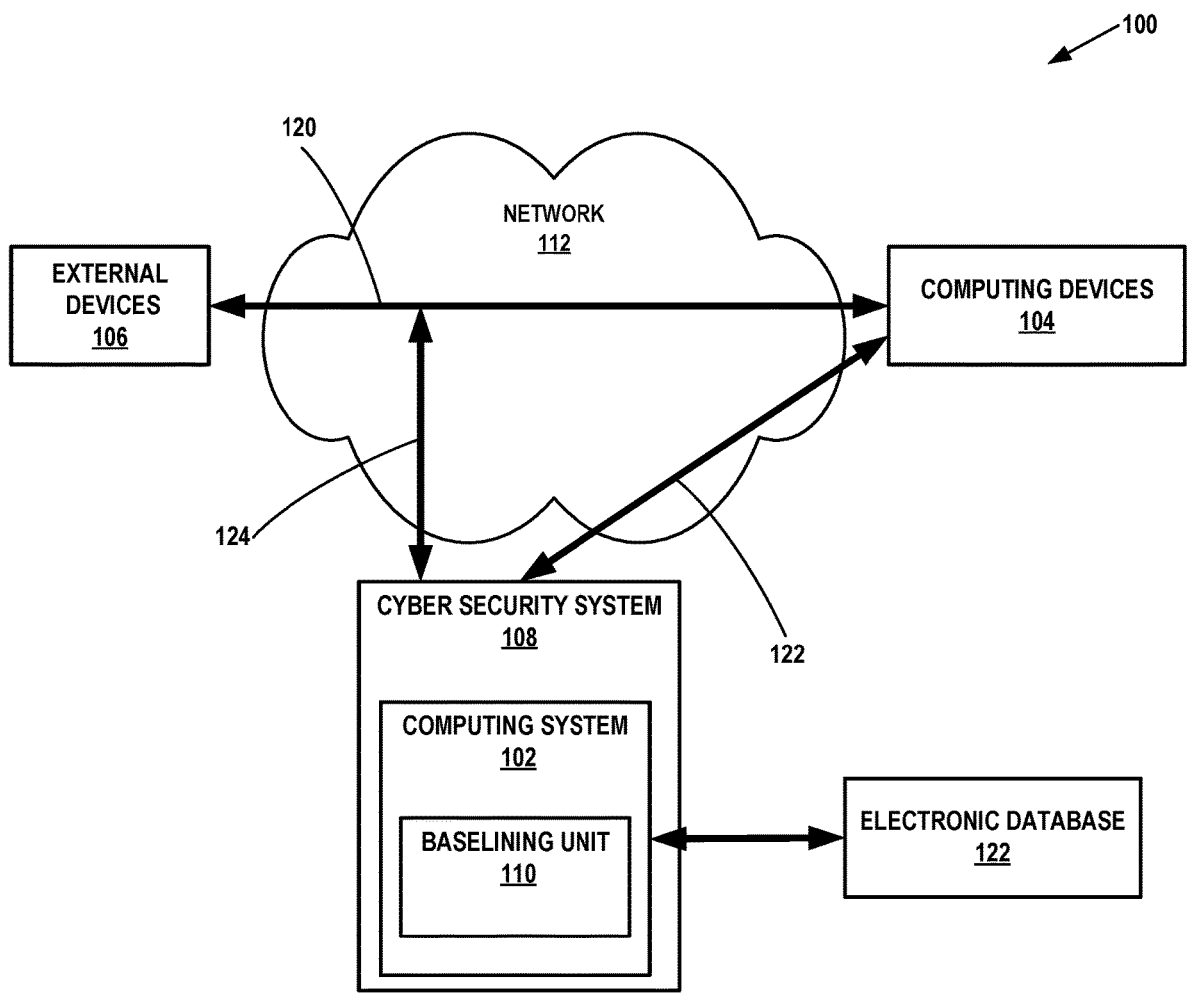
FIG. 1 is a block diagram illustrating an example cyber security environment including a cyber security system, in accordance with one or more aspects of this disclosure.

Cyber security encompasses monitoring against a wide range of information and/or cyber-attack patterns originating from a diverse set of attackers. Visibility into machine-generated telemetry is foundational to those monitoring capabilities, and that telemetry may be generated across many different technology platforms which may be hosted in different networks, geographies, and support models. Entities tasked with monitoring this telemetry, e.g., cyber security teams, may not be the same entities that are responsible for generating or transporting the information and/or data.

Cyber security organizations may employ methods to identify problems in the generation or transport of information/data. Identifying anomalies in operational data can be difficult with statistical methods that focus on expected values and variance around those expected values. Operational impacts such as outages or upstream logging changes can cause negative volumetric anomalies. Human or machine activity can cause anomalous increases to overall volumes and within certain types of events.

Cyber security baselining includes identifying cyber security threats and/or problems in the generation or transport of information/data, e.g., over networks and/or between devices. Cyber security baselining and/or trend analysis may be used to monitor important metrics continually and benchmark those metrics with historical norms. A cyber security baseline may include a predicted (e.g., also referred to as an "expected") event metric value, such as a historical mean, median, or the like, and a predicted and/or expected range for the event metric value. Once a monitored metric is outside of the expected range, an alert may be generated indicating that manual investigation may be needed. Cyber security baselining can be achieved with domain knowledge or statistical analysis or control theory at certain high levels (e.g., auditing frequency and/or data accumulation time-period levels) such as daily, weekly, or monthly. With the ever-changing nature of cyber security, more frequent and more granular/detailed baselining and more real time alerting may be beneficial. Fewer false positive and less false negative alerts may be preferred, with emphasis placed on increasing precision to reduce false positive manual workloads.

For example, an email security gateway appliance may be used for email security. The gateway prevents advanced threats, blocks spam and viruses, and helps enable corporate email policy for enterprises and satellite offices. There can be several million events (e.g., emails) generated by the gateway appliance. A cyber security system and/or team may evaluate whether the number of total events from the last hour (e.g., a "total number of emails per time period" metric) is within an expected range (e.g., a baseline range) determined based on historical data regarding the total events per hour. If the event number is too high, it may indicate the company is under an email phishing campaign attack or other email virus attack. If the event number is too low, it can indicate a security appliance malfunction or log file, e.g., event trace log (ETL), ingestion issue, that the company email system is either not fully protected or the security operation center analysts lost email security event visibility, or the like. For example, if the total number of emails expected is between 1 million and 5 million, and the actual number of total events is 4 million, the company email system is within its security posture, while any number outside that 1-5 million email range may trigger an investigation to prevent further and/or escalating security issues. A false positive occurs when an actual event metric value (e.g., number of events/emails in the current example) is out of the expected range, but there is nothing wrong with the security operation or no actions can be taken. A false negative happens when an actual event metric is within the predefined ranges, while something is wrong with the security device or a security attack is arising, and some mitigation actions should be taken. In some examples, an actual event metric value may be determined from a plurality of events, e.g., obtained during a period of time.

Predicted and/or expected event metrics, as described herein, may include an expected event metric value for a period of time, such as a number of events within the period of time, and/or an expected event metric range for the metric value for the period of time. Predicted event metrics may be obtained with increasing detail, accuracy, frequency, and scale, e.g., using "big data technology" and data science models, such as machine learning (ML). However, such forecasting models have challenges when applied to cyber security baselining. For example, different statistical or ML models have differing hypermeters for "tuning" a model, e.g., statistical distribution selection, dependent/independent variable transformation, missing value imputation, outlier detection and replacement in a training dataset, convergence threshold, optimization algorithm choice, length of historical data, or the like. Also, model performance metrics are mainly designed for point estimation, e.g., R-square, root-mean-square error, mean absolute percent error, Mean Absolute Error (MAE), Mean Squared Error (MSE), Akaike information criterion (AIC) or Bayesian information criterion (BIC), area under the receive operating characteristic (ROC) curve, F-score, or the like. False positives may be reduced at the expense of increasing false negatives (e.g., equivalent to suppressing true positives). For example, when a predicted value of an event metric (e.g., the event metric's "expected" value) is close to an actual value, a forecasting model may reduce false positive cases by factoring in hidden patterns/signals from historical data, but if a predicted value is close to an actual value, potentially a forecasting model will suppress certain meaningful true positives by adapting the new anomaly as a new normal too quickly, e.g., thereby increasing false negatives. Also, while cyber security baselining forecasting models may include supervised learning for predicting a future "normal" and/or expected metric value, the forecasting models are unsupervised with respect to reducing both false positives and false negatives, and there is no initial feedback on whether an out-of-range alert is a true positive or a false positive and postmortem analysis is needed to determine whether the process/model missed any positive cases to determine false negatives.

As such, different forecasting models have varying degrees of success in predicting expected event metric values as to decreasing false positives and false negatives while maintaining or increasing sensitivity to true positives, and which may change based on the nature of the events (emails, messages, access requests, notifications), event frequency and volume, the period of time over which a predicted event metric value is to be used for, or the like. In other words, some predicted event metric values are better than others, and which forecasting models output the superior or inferior predicted event metric values may vary over different periods of time. A challenge for cyber security baselining is then to select, for a given period of time, a forecasting model to generate a predicted event metric value as the accepted baseline value, from amongst a plurality of predicted event metric values generated by a plurality of forecasting models, such that the predicted event metric value maximizes true positives and minimizes false positives and false negatives during that period of time.

In accordance with one or more techniques of this disclosure, a model range multi-partition error (MRME) selection criterion may be applied to forecasting models to determine and/or select a forecasting model that provides a predicted event metric value and/or expected metric value range maximizing true positives and minimizing false positives and false negatives. The MRME criterion comprises a weighted sum of the precision, accuracy, and relative range of a predicted event metric value and predicted value range with regard to a baseline metric value. In some examples, the weights of each of the three terms of the MRME criterion may be adjusted based on feedback corresponding to the actual event metric value during a period of time, e.g., feedback on the true positives, false positives, and false negatives resulting from a forecasting model's prediction of the expected metric value and expected range of metric values. For example, an analyst (e.g., a human, device or algorithm) may determine which events within a period of time are normal or abnormal, from which a number of true positives, false positives, and false negatives resulting from a model's predicted expected metric value and expected range of metric values may be determined, and a statistical F-score or F-measure may be determined based on the true positives, false positives, and false negatives. The F-score may be determined for a plurality of weighting combinations, and a weighting combination resulting in the largest F-score may be selected. In some examples, a system may be configured to select a model from a plurality of models based on the MRME criterion, and the system may be configured to determine and/or adjust the weights of the terms of the MRME criterion based on feedback, e.g., the F-score.

FIG. 1 is a block diagram illustrating an example cyber security environment 100 including a cyber security system 108, in accordance with one or more aspects of this disclosure. In the example of FIG. 1, cyber security environment 100 includes computing devices 104 for which cyber security system 108 provides cyber security protection. Cyber security environment 100 also includes external devices 106, e.g., devices for which cyber security system 108 does not provide cyber security protection, and which communicate with computing devices 104, e.g., via network 112.

Network 112 may comprise a public network, such as the Internet. Although illustrated as a single entity, network 112 may comprise a combination of public and/or private networks. In some examples, network 112 may comprise one or more of a wide area network (WAN) (e.g., the Internet), a local area network (LAN), a virtual private network (VPN), or another wired or wireless communication network.

Computing devices 104 and external devices 106 may include any device configured to receive, process, and/or send electronic, digital, and/or computer information. For example, computing devices 104 and/or external devices 106 may include any or all of computing devices such as desktop or laptop computers, mobile devices, smartphones, smartwatches, smartglasses, or any smart devices, tablet computers, wearable devices, servers, intermediate network devices, workstations, personal digital assistants, calculators, vehicle computing systems or on-board computers, or the like.

Computing devices 104 and external devices 106 may communicate information 120, e.g., via network 112, which may be a potential source of cyber security threats to computing devices 104. For example, information 120 may comprise any electronic, digital, or computing information, e.g., emails, messages, data requests, webpage requests, port scanning requests, application programming interface (API) requests, or any other information capable of being communicated between computing devices 104 and external devices 106. The information 120, or process of communicating information 120, may generate events 122, 124, which may be indicative of potential cyber security threats. Events 122 may be captured by computing devices 104 and sent to cyber security system 108, e.g., via network 112 in the example shown, or in other examples via direct wired or wireless connection, or any other suitable method. Events 122 may be captured from network 112 by cyber security system 108, e.g., via monitoring network 112. For example, statistics regarding email traffic of computing devices 104 may be logged by computing devices 104 and sent to cyber security system 108, and/or cyber security system 108 may monitor and log email traffic over network 112.

Cyber security system 108 may be configured to provide cyber security protection for computing devices 104. For example, cyber security system 108 may be configured to identify cyber security threats and/or problems, monitor information 120, receive events 122, 124, block, filter, and/or otherwise modify information 120, perform diagnostics on computing devices 104, run antivirus programs or otherwise fix computing devices 104 in response to a cyber security attack or threat, or the like. Cyber security system 108 may include one or more gateway appliances, such as one or more email gateway appliances configured to prevent advanced threats, block spam and viruses, helps enable corporate email policy for enterprises and satellite offices, and generate events 122 and/or 124. Cyber security system 108 includes computing system 102.

Baselining unit 110 may operate on computing system 102. In some examples, computing system 102 may include one or more computing devices. In examples where computing system 102 includes two or more computing devices, the computing devices of computing system 102 may act together as a system and may be distributed. Example types of computing devices include server devices, personal computers, mobile devices (e.g., smartphones, tablet computers, wearable devices), intermediate network devices, or the like.

Computing system 102 may receive events 122, 124. Baselining unit 110 may be configured to determine one or more values for one or more metrics against which events 122, 124 may be compared. Event metrics may include statistics regarding the number of events (mean, median, range, and the like) or the content of the events (size of an email, number of characters of a message, whether there are email attachments and attachment characteristics such as size, type, or the like). Baselining unit 110 may be configured to determine control limits, e.g., a cyber security control limit or limits, for one or more of the event metrics, and to output an alert if one or more events 122, 124 causes a metric to be out of the control limits. In some examples, the one or more metrics may be time-based or a rate, e.g., number per time period. For example, a baseline email metric may be a historical average number of emails sent or received by computing devices 104 per second, hour, day, week, month, year, or any other period of time. A control limit may be a range of a lowest and highest expected number of emails per second, hour, day, week, month, year, or any other period of time. Cyber security system 108 may be configured to monitor the current, or actual, event metric, e.g., the number and/or rate of emails currently being sent or received, and compare the actual event metric value to the baseline event metric value and/or baseline event metric value range.

Baselining unit 110 may determine the one or more baseline event metric values via forecasting. For example, baselining unit 110 may be configured to execute one or more forecasting models. The one or more forecasting models may be configured to predict one or more expected values for one or more metric and/or and expected range for the one or more metric, e.g., the control limit(s). Examples of forecasting models include any suitable big data technology, data science model, statistical model, ML model, algorithm, or process. Baselining unit 110 may also be configured to change and/or update the one or more metric values and/or control limits, e.g., based on subsequently receiving and/or processing additional events 122, 124.

Baselining unit 110 may be further configured to evaluate and select the one or more forecasting models and/or predictions of the one or more forecasting models. For example, baselining unit 110 may be configured to select one or more forecasting models based on a criterion, such as a MRME criterion. In some examples, baselining unit 110 may be configured to select one or more forecasting models based on a criterion and update the criterion, e.g., the MRME criterion, based on feedback. The feedback may comprise information related to the accuracy and precision of the predicted event metric values and ranges/control limits predicted by the forecasting models, as well as outcomes based on the predicted event metric values and ranges/control limits, e.g., true positive alerts, false positive alerts, and false negative alerts that occurred and/or generated based on the predicted control limits. The feedback may include investigation, by a system and/or human analyst, into events 122, 124 to determine which alerts generated via the predicted event metric values and control limits were true positive alerts, false positive alerts, and false negative alerts.

Baselining unit 110 may be configured to determine baseline event metric values and ranges/control limits that reduce and/or minimize false positive alerts and false negative alerts while increasing and/or maximizing true positive alerts. For example, baselining unit 110 may be configured to update and/or change the forecasting model evaluation/selection criterion, e.g., the MRME selection criterion. For example, baselining unit 110 may update the weighting of certain terms of the MRME criterion based on the feedback, e.g., such as an analysis or classification of the feedback such as an F-score. Baselining unit 110 may then select one or more forecasting model based on the updated criterion.

In some examples, baselining unit 110 may be configured to dynamically determine baseline event metric values and control limits, e.g., to react to special cause variation in the underlying event. For example, an expected number and/or rate of emails sent and received by computing devices 104 may change for certain periods of time, e.g., holidays, or due to unforeseen events, e.g., a natural disaster, war, or the like. Baselining unit 110 may be configured to periodically, continually, or on demand, update the MRME forecasting model selection criterion, e.g., as feedback becomes available and/or as event statistics change, update forecasting model selection based on the updated MRME forecasting model selection criterion, and update the baseline event metric values and control limits via event metric prediction generated by the forecasting model or models selected via the updated MRME selection criterion.

Figure 2:
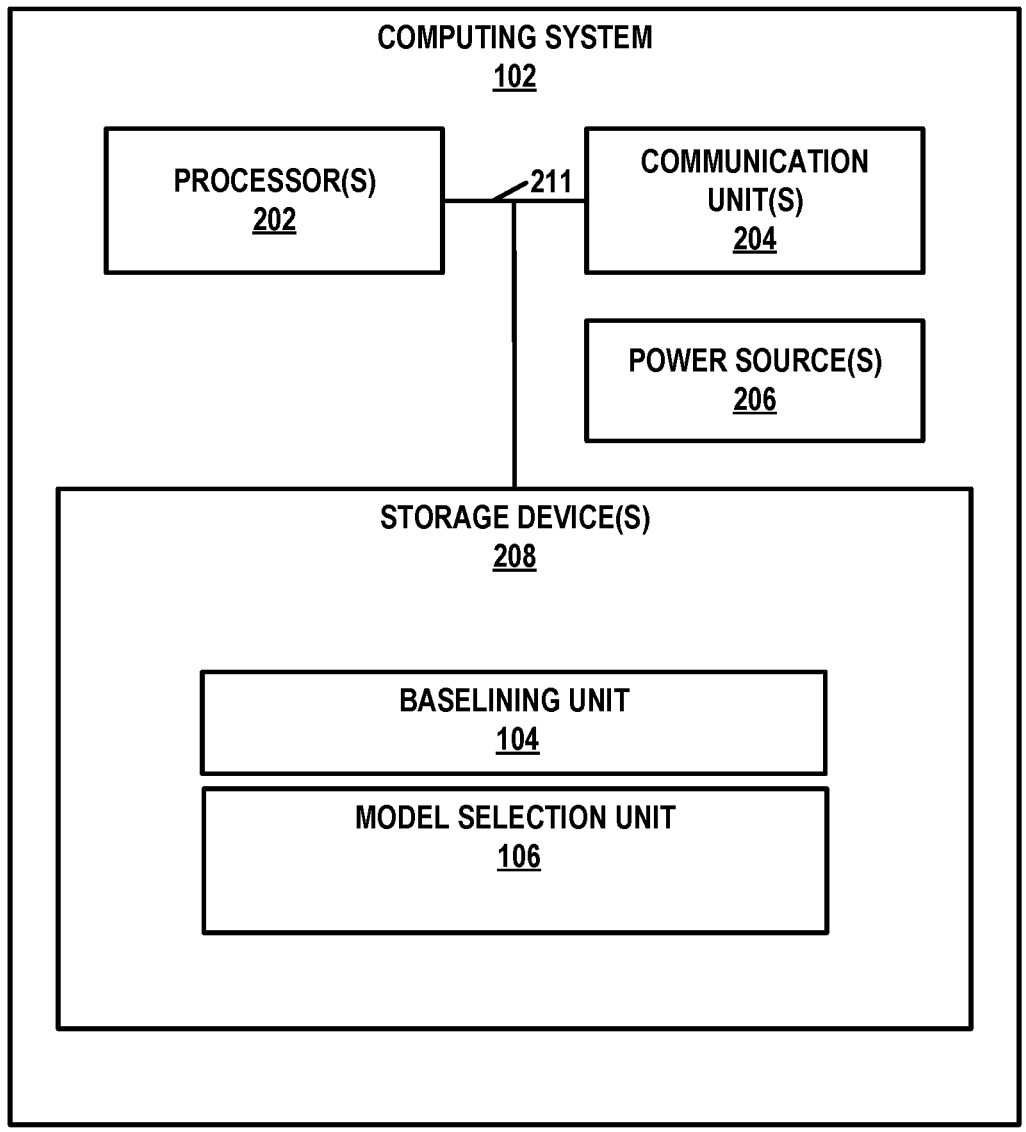
FIG. 2 is a block diagram illustrating an example computing system that implements a cyber security baselining application in accordance with one or more aspects of this disclosure.

FIG. 2 is a block diagram illustrating example computing system 102 that implements cyber security baselining unit 110 in accordance with one or more aspects of this disclosure. FIG. 2 illustrates only one example of computing system 102, without limitation on many other example configurations of computing system 102, and may comprise a separate system of one or more computing devices.

As shown in the example of FIG. 2, computing system 102 includes one or more processors 202, one or more communication units 204, one or more power sources 206, one or more storage devices 208, and one or more communication channels 211. Computing system 102 may include other components. For example, computing system 102 may include input devices, output devices, display screens, and so on. Communication channel(s) 211 may interconnect each of processor(s) 202, communication unit(s) 204, and storage device(s) 208 for inter-component communications (physically, communicatively, and/or operatively). In some examples, communication channel(s) 211 may include a system bus, a network connection, an inter-process communication data structure, or any other method for communicating data. Power source(s) 206 may provide electrical energy to processor(s) 202, communication unit(s) 204, storage device(s) 208 and communication channel(s) 211. Storage device(s) 208 may store information required for use during operation of computing system 102

Processor(s) 202 comprise circuitry configured to perform processing functions. For instance, one or more of processor(s) 202 may be a microprocessor, an application-specific integrated circuit (ASIC), a field-programmable gate array (FPGA), or another type of processing circuitry. In some examples, processor(s) 202 of computing system 102 may read and execute instructions stored by storage device(s) 208. Processor(s) 202 may include fixed-function processors and/or programmable processors. Processor(s) 202 may be included in a single device or distributed among multiple devices.

Communication unit(s) 204 may enable computing system 102 to send data to and receive data from one or more other computing devices (e.g., via a communications network, such as a local area network or the Internet). In some examples, communication unit(s) 204 may include wireless transmitters and receivers that enable computing system 102 to communicate wirelessly with other computing devices. Examples of communication unit(s) 204 may include network interface cards, Ethernet cards, optical transceivers, radio frequency transceivers, or other types of devices that are able to send and receive information. Other examples of such communication units may include BLUETOOTH™, 3G, 4G, 5G, and WI-FI™ radios, Universal Serial Bus (USB) interfaces, etc. Computing system 102 may use communication unit(s) 204 to communicate with one or more other computing devices or systems, such as electronic database 122. Communication unit(s) 204 may be included in a single device or distributed among multiple devices.

Processor(s) 202 may read instructions from storage device(s) 208 and may execute instructions stored by storage device(s) 208. Execution of the instructions by processor(s) 202 may configure or cause computing system 102 to provide at least some of the functionality ascribed in this disclosure to computing system 102. Storage device(s) 208 may be included in a single device or distributed among multiple devices.

As shown in the example of FIG. 2, storage device(s) 208 may include computer-readable instructions associated with baselining unit 104. Baselining unit 104 shown in the example of FIG. 2 is presented for purposes of explanation and may not necessarily correspond to actual software units or modules within storage device 208.

As described above, baselining unit 104 is configured to evaluate and select the one or more forecasting models and/or predictions of the one or more forecasting models based on a MRME selection criterion, update and/or change the MRME forecasting model selection criterion based on feedback, and determine the one or more baseline event metric values and/or event metric control limits via the one or more selected forecasting models.

As described above, the MRME criterion comprises a weighted sum of the precision, accuracy, and relative range of a predicted event metric value and predicted value range with respect to a baseline metric value that may be applied to forecasting models and/or predicted event metric values and/or ranges to determine and/or select a forecasting model that provides a predicted event metric value and/or predicted event metric value range maximizing true positives and minimizing false positives and false negatives. Equations (1)-(3) are example weighted terms of an example MRME criterion representing a weighted prediction accuracy (Equation (1)), a weighted prediction precision (Equation (2)), and a weighted prediction relative range (Equation (3)). Equation (4) is an example MRME criterion comprising a sum of three weighted terms, e.g., a weighted sum of accuracy, precision, and relative range in order from left to right in equation (4).

$$\text{Weighted Prediction Accuracy} = w1 * \frac{(|A - E|)}{(A + 1)} \quad (1)$$

$$\text{Weighted Prediction Precision} = w2 * \frac{(U - L - A)}{(A + 1)} \quad (2)$$

$$\text{Weighted Prediction Relative Range} = w3 * \frac{(U - L - E)}{(E + 1)} \quad (3)$$

$$MRME = w1 * \frac{(|A - E|)}{(A + 1)} + w2 * \frac{(U - L - A)}{(A + 1)} + w3 * \frac{(U - L - E)}{(E + 1)} \quad (4)$$

In Equations (1)-(4), A is the actual event metric value, e.g., the average number and/or rate of emails sent and received by computing devices 104 for a given period of time. E is a model point estimation of the metric value, e.g., the predicted event metric value given by a forecasting model. L is a lower bound prediction of the metric value given by the forecasting model and U is an upper bound prediction of the metric value given by the forecasting model, e.g., the predicted range is R=U−L. The weights w1, w2, and w3 are values between 0 and 1 and are normalized, e.g., w1+w2+w3=1. The weights w1, w2, and w3 may be an accuracy weight value (w1), a precision weight value (w2), and a range weight value (w3).

Equation (1) represents a weighted prediction accuracy of the predicted event metric value. For example, the weighted prediction accuracy of the predicted event metric value comprises a weighted absolute value of the difference between the actual event metric value A and the predicted event metric value E, the absolute value of the difference multiplied by the accuracy weight value w1 (and divided by A+1 and/or otherwise normalized). Equation (2) represents a weighted prediction precision of the predicted event metric value range. For example, the weighted prediction precision of the predicted event metric value range comprises a weighted precision difference between the predicted event metric value range U-L and the actual event metric value A, the difference multiplied by the precision weight value w2 (and divided by A+1 and/or otherwise normalized). Equation (3) represents a weighted prediction relative range which may be indicative of a weighted width of the predicted event metric value range. For example, the weighted prediction relative range comprises a range difference between the predicted event metric value range U-L and the predicted event metric value E, the range difference multiplied by the range weight value w3 (and divided by E+1 and/or otherwise normalized).

Initially, baselining unit 110 may set the three weights w1, w2, and w3 to be equal, and then subsequently adjust the weights, e.g., as feedback becomes available or as the underlying statistics of events 122, 124 change. The lower the MRME, the better the performance of the forecasting model.

Figure 3:
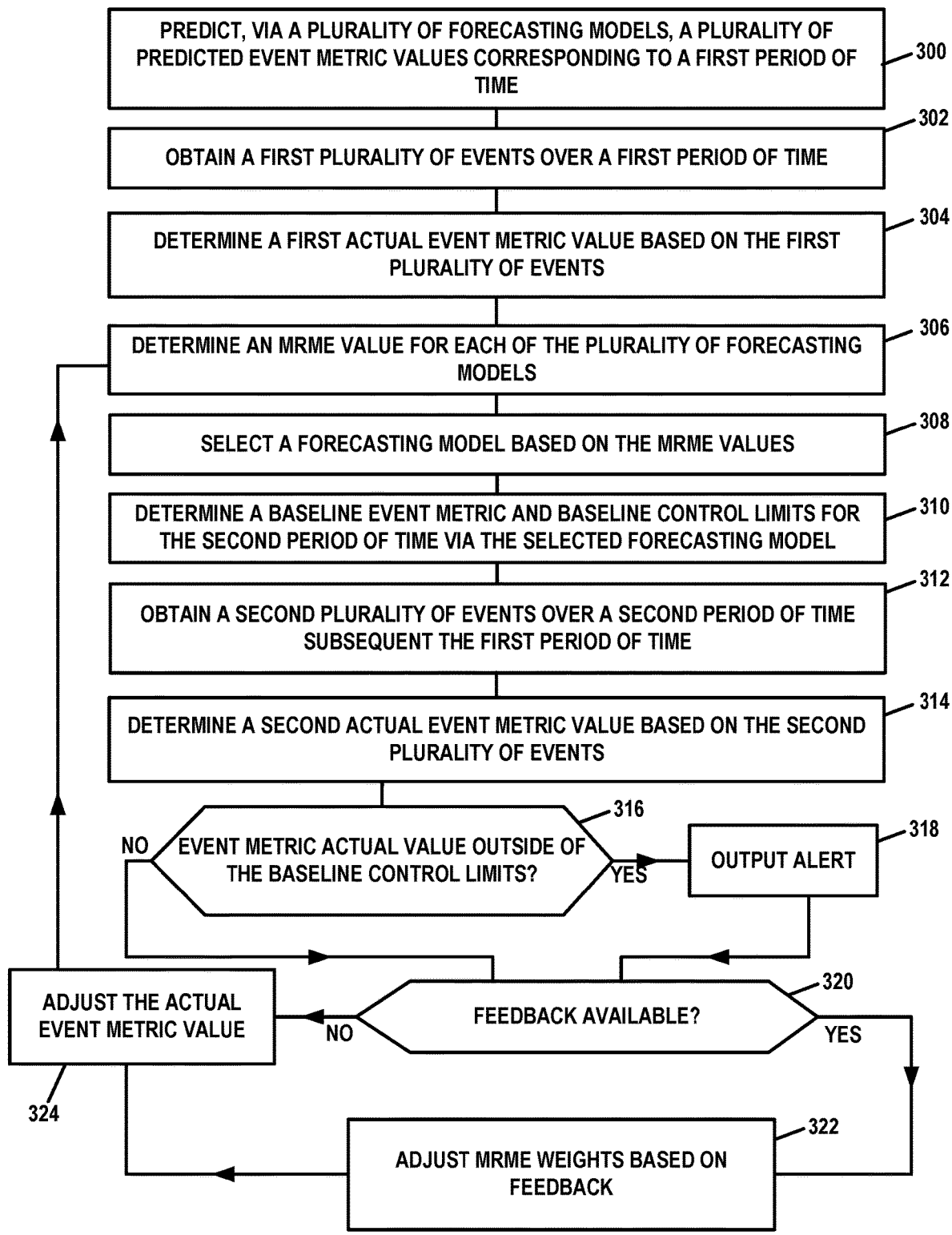
FIG. 3 is a flowchart illustrating an example method of determining a cyber security baseline in accordance with one or more aspects of this disclosure.

FIG. 3 is a flowchart illustrating an example method of determining a cyber security baseline in accordance with one or more aspects of this disclosure. In some examples, the method may be an example of the operation of baselining unit 110. In other examples, the method and/or operations of baselining unit 110 may include more, fewer, or different actions. The flowchart of this disclosure is described with respect to the other figures of this disclosure. However, the flowchart of this disclosure is not so limited. For ease of explanation, the flowchart of this disclosure is described with respect to system 100 and computing system 102, but the flowchart of this disclosure may be applicable mutatis mutandis with respect to privacy aspects of system 100.

Figure 4:
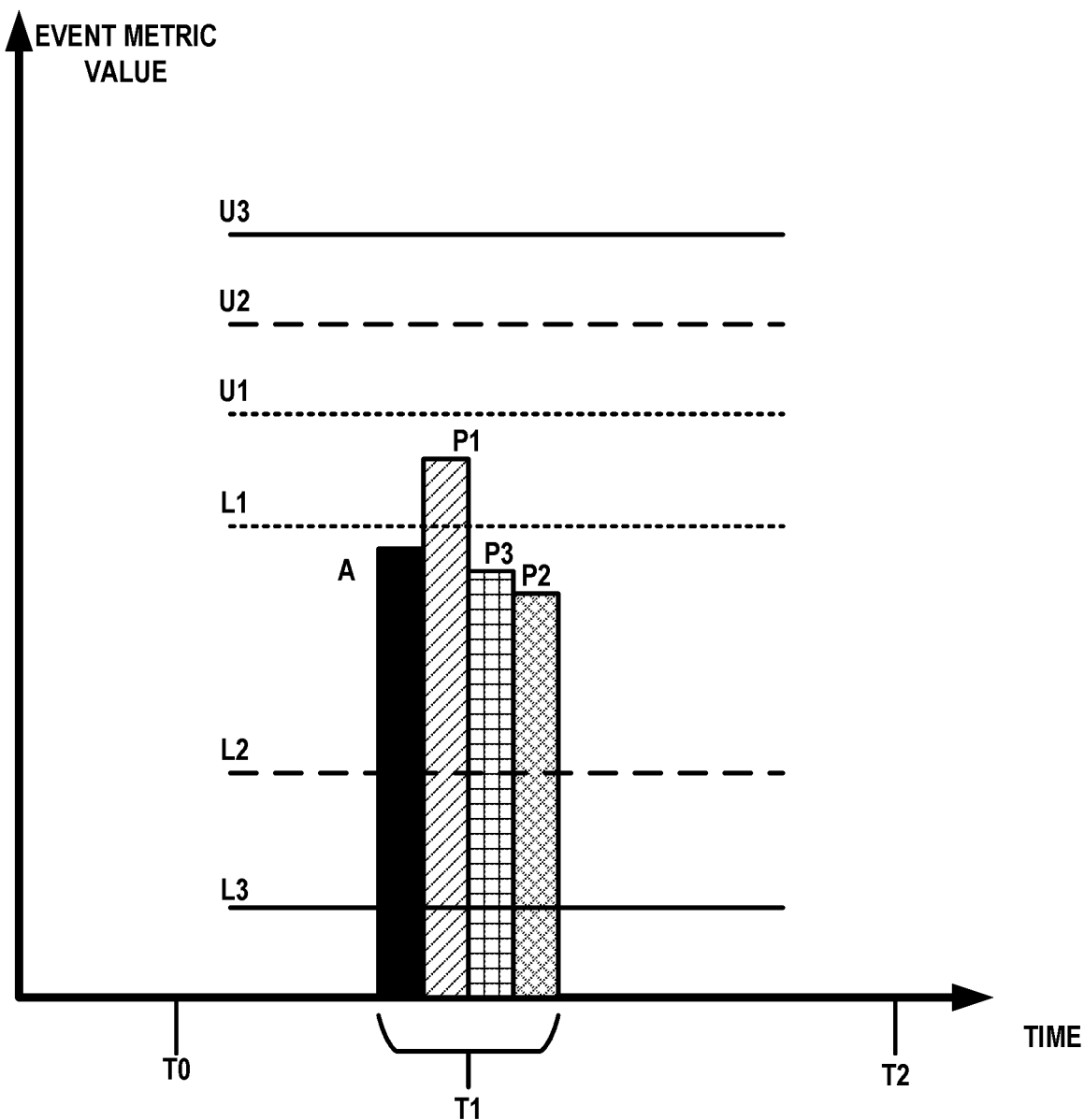
FIG. 4 is a conceptual plot illustrating a plurality of event metric values in accordance with one or more aspects of this disclosure.

The method of FIG. 3 is described with reference to FIG. 4. FIG. 4 is a conceptual plot illustrating a plurality of event metric values in accordance with one or more aspects of this disclosure. Although three predictions are shown in FIG. 4, baselining unit 110 may determine more or fewer predictions, e.g., two predictions, or four or more predictions.

Baselining unit 110 predicts, via a plurality of forecasting models, a plurality of predicted event metric values corresponding to a first period of time (300). In some examples, the first period of time is a future first period of time, e.g., occurs after the time or times at which the plurality of predicted event metric values are predicted. In some examples, the plurality of forecasting models may predict the plurality of predicted event metric values based on one or more historical events, e.g., events occurring before the time or times at which the plurality of predicted event metric values are predicted, or any other information, e.g., based on initial forecasting model parameters, simulated events, historical event statistics and/or event content, or any other information or data suitable for the forecasting models to generate one or more predicted event metric values.

For example, baselining unit 110 may execute, or cause computing system 102 to execute, a first forecasting model to predict a first predicted event metric value (e.g., P1 in FIG. 4) and a first predicted event metric value range (e.g., U1-L1 in FIG. 4) corresponding to a future first plurality of events (e.g., yet to actually occur) over the first time period (e.g., T1 in FIG. 4), baselining unit 110 may execute (or cause to be executed) a second forecasting model to predict a second predicted event metric value (e.g., P2 in FIG. 4) and a second predicted event metric value range (e.g., U2-L2 in FIG. 4) corresponding to the first plurality of events over the first period of time, and baselining unit 110 may execute (or cause to be executed) a third forecasting model to predict a third predicted event metric value (e.g., P3 in FIG. 4) and a third predicted event metric value range (e.g., U3-L3 in FIG. 4) corresponding to the first plurality of events over the first period of time. In some examples, the first, second, and third predicted event metric values are predicted before the occurrence of any or all of the first plurality of events and/or before the first period of time. Baselining unit 110 may also determine ranges and/or control limits for each of the predictions, e.g., via the plurality of forecasting models. For example, baselining unit 110 may determine upper (U) and lower (L) control limits for each prediction, such as (U1, L1) for prediction P1, (U2, L2) for prediction P2, and (U3, L3) for prediction P3 as shown in FIG. 4.

For example, the time periods T0, T1, and T2 illustrated in FIG. 4 may be one hour, and the event metric may be the number of emails sent or received by computing devices 104 within each of time periods T0, T1, T2, e.g., in an hour. The predicted event metric values P1, P2, and P3 are the expected number of emails for time period T1 as predicted by three forecasting models. In some examples, predicted event metric values P1, P2, and P3 may be predicted by fewer than three forecasting models, e.g., one or two forecasting models having different parameters and/or settings and may output more than one prediction corresponding to T1. In the example shown in FIG. 4, the control limits corresponding to each of predicted event metric values P1, P2, and P3 are the expected range of number of emails during T1.

Returning to FIG. 3, baselining unit 110 obtains a first plurality of events 122, 124 over the first period of time (e.g., T1) (302), and baselining unit 110 determines a first actual event metric value (e.g., A in equation (4) for the first period of time T1) of the event metric corresponding to the first plurality of events (304). In some examples, baselining unit 110 may obtain the events of the plurality of events 122, 124 continuously and/or at a plurality of times over the first period of time (e.g., at a particular frequency), and determine the first actual event metric value based on the obtained events continuously and/or at the plurality of times over the first period of time. For example, baselining unit 110 may obtain events and determine and adjust the first actual event metric value based on the currently obtained events during the first period of time, e.g., so as to monitor the first actual event metric value during the course of the first period of time and in addition to determining a final first actual event metric value for the first period of time based on all of the first plurality of events that occurred during the first period of time.

For example baselining unit 110 may receive data from computing devices 104 and/or cyber security system 108 including events 122, 124. In some examples, each event of the plurality of events 122, 124 comprises the sending or receiving of an email by computing devices 104. In some examples, the plurality of events 122, 124 may comprise one or more rates of the sending or receiving of emails by computing devices 104, e.g., during one or more sub-time periods within the period time.

In some examples, baselining unit 110 may determine the first actual event metric value based on an average and standard deviation of the obtained first plurality of events, e.g., a number and/or rate of emails sent and received by computing devices 104 during the first period of time. Baselining unit 110 may then determine the first actual event metric value to be the average email rate.

Baselining unit 110 determines an MRME selection criterion value for each of the forecasting models' predictions (306). For example, baselining unit 110 may determine an MRME value for each of the first, second, and third forecasting models of FIG. 4 based on P1, U1, L1, and P2, U2, L2, and P3, U3, L3). In some examples, baselining unit will determine the MRME values via equation (4) above, with the determined first actual event metric value A corresponding to the first plurality of events over the first period of time. Baselining unit 110 may use each predicted event metric value, e.g., P1, P2, P3 as the model point estimation E in equation (4), and the upper and lower limits of the each of the predicted ranges as U and L in equation (4). For example, baselining unit 110 determines a first MRME value based on the first actual event metric value A, the first predicted event metric value P1, and the first predicted event metric value range (U1-L1), where the first MRME value is indicative of an accuracy, precision, and relative range (e.g., the three weighted terms of equation (4)) of the first forecasting model, baselining unit 110 determines a second MRME value based on the first actual event metric value A, the second predicted event metric value P2, and the second predicted event metric value range (U2-L2), where the second MRME value is indicative of an accuracy, precision, and relative range of the second forecasting model, and baselining unit 110 determines a third MRME value based on the first actual event metric value A, the third predicted event metric value P3, and the third predicted event metric value range (U3-L3), where the third MRME value is indicative of an accuracy, precision, and relative range of the third forecasting model. In some examples, e.g., at the first and/or initial determination of MRME values for each of the forecasting models, baselining unit 110 may determine the MRME values with $w1=w2=w3=\frac{1}{3}$, e.g., with each of the accuracy, precision, and relative range terms equally weighted.

Baselining unit 110 selects a forecasting model based on the plurality of MRME values (308). For example, baselining unit 110 may choose a "selected forecasting model" to be the forecasting model for which the MRME value is the least. For example, each of the three terms of the calculation of the MRME selection criterion in equation 4 represents how far the predicted event metric value (e.g., E) is from the historical norms, how wide the predicted range (e.g., U-L) is relative to the historical norm, and how wide the predicted range is relative to the predicted event metric value, and a forecasting model that minimizes combined terms (e.g., predicts an event metric value close to the historical norm and within a relatively tight range) may be selected as the accepted "best" forecasting model.

Conventionally, in time-series forecasting, a prediction yielding the closest prediction to the actual and/or accepted norm or normal value of the event metric value may be selected. For example, the third forecasting model of FIG. 4 that predicts P3, U3, L3 would be selected because P3 minimizes "error" relative to the accepted normal event metric value, A. However, for cyber security baselining, predicting an accurate range, e.g., control limits, may be more important and/or operationally meaningful in order to ultimately monitor the event metric by generating true positive alerts and reducing/minimizing false positive and false negative alerts.

In accordance with the techniques disclosed herein, baseline unit 110 selects a forecasting model and/or prediction based on the three-part calculation of equation (4). In the example shown in FIG. 4, using an MRME selection criteria with equal weights, baselining unit 110 may select the first forecasting model that predicts P1, U1, L1, determining that the first forecasting model has the lowest MRME score, e.g., because the first forecasting model reduces both the second and third terms of equation (4) since it has the smallest range U-L relative to the second and third forecasting models. In the example shown, the range of the first prediction model (e.g., U1-L1) produces second and third terms in equation (4) that are smaller than the second and third terms of the second and third forecasting models, and that is smaller in an amount enough to compensate for the first forecasting model predicting the worst event metric value estimate P1 of the three forecasting models, e.g., producing a higher first term of equation (4) relative to the other two forecasting models. Baselining unit 110 may select P1 to be a selected predicted event metric value, and (U1-L1) to be a selected predicted event metric value range.

Having selected a forecasting model, baselining unit 110 determines a baseline event metric and/or baseline control limits for the second period of time via the selected forecasting model (310). For example, and with reference to FIG. 4, baselining unit 110 may set first predicted event metric value P1 (e.g., now selected predicted event metric value P1) as the baseline event metric value and U1 and L1 as the baseline event metric control limits.

In some examples, baselining unit 110 may determine alerts that the currently selected baseline (e.g., baseline event metric value P1 and baseline event control limits UL L1) would have generated during the first period of time, e.g., so as to adjust the weights w1, w2, w3 of the MRME selection criteria metric. In some examples, an evaluation by an analyst regarding the alerts that would have been generated may be performed, e.g., by a human and/or analysis system (not shown), so as to provide feedback on whether the alerts that would have been generated would have been false positives or true positives, and whether alerts were missed, e.g., false negatives. In other words, feedback on the first plurality of events may be available, and the method may proceed at (320) below, e.g., so as to adjust the weights w1, w2, w3 of the MRME selection criteria metric. However, in some examples, feedback may not be available, and the method may proceed to (312) below.

Baselining unit 110 obtains a second plurality of events 122, 124 over a second period of time subsequent the first period of time (312), and baselining unit 110 determines a second actual event metric value (e.g., A in equation (4) for the second period of time T2 and A as illustrated in FIG. 4 for T2) based on a second plurality of events (314). In some examples, (312) and (314) are substantially the same as (302) and (304) described above.

Baselining unit 110 determines whether the second actual event metric value is outside of the determined control limits (316), and if so, output an alert based on the second actual value being outside of the cyber security control limit (318), e.g., the YES branch of (316). For example, baselining unit 110 may determine whether the second actual event metric value is outside the range defined by U1, L1 selected as the baseline range at (310).

In some examples, baselining unit 110 may determine whether the second actual event metric value is outside the baseline control limits after the second period of time. For example, baselining unit 110 may determine a second actual event metric values for each individual event of the plurality of events (e.g., determine a plurality of second actual event metric values) and compare each individual second actual event metric value to the baseline event metric value and/or control limits and generate an alert for each instance of the second event metric value being outside of the control limits. In some examples, or baselining unit 110 may determine the second actual event metric value based on all of the second plurality of events (e.g., an average, median, sum, or the like), and output an alert based on whether the second actual event metric value is outside of the baseline event metric control limits. In some examples, baselining unit 110 may determine the second actual event metric value based on a subset of the second plurality of events.

In some examples, baselining unit 110 may determine whether the second actual event metric value is outside the baseline control limits during the second period of time. For example, baselining unit 110 may determine the second actual event metric value for each individual event of the plurality of events and compare each individual second actual event metric value to the baseline event metric value and/or control limits and generate an alert for each instance of the second event metric value being outside of the control limits during the second period of time, e.g., so as to monitor the events versus the baseline and generate alerts earlier and/or substantially in real time. For example, the event metric may be a count of emails sent or received by computing devices 104 during a period of time (which may or may not be equal to the first or second periods of time), e.g., an email rate. Baselining unit 110 may monitor the email rate during the second period of time, e.g., continuously or discretely with a particular frequency, and adjust and/or determine the current email rate (e.g., the current second actual event metric value) as each email (e.g., event) is obtained (which may be substantially near in time to when the email/event occurred), and output alerts substantially at the same time as when the second actual event metric changes to be outside the control limits. In some examples, baselining unit 110 may determine the second actual event metric value based on a subset of the second plurality of events and during the second period of time, e.g., baselining unit 110 may determine an email rate based on the number of emails sent or received by computing device 104 during a portion of the second period of time, or based on the amount of time for a particular number of emails to be sent or received by the computing device 104, or the like, and output alerts substantially at the same time as when the second actual event metric changes to be outside the control limits.

Referring to FIG. 4, baselining unit 110 may determine the second actual event metric value for the second plurality of events to be A at (314), and may determine that second actual event metric value A is less than control limit L1, e.g., and thus "outside" the current baseline control limit L1, e.g., lower than the low control limit L1. Baselining unit 110 may then output an alert based on A being outside of the control limits U1, L1, and second actual event metric value A may be classified as a "predicted positive alert."

If baselining unit 110 determines that the second actual event metric value is not outside one or more baseline control limit (not shown in FIG. 4), the method proceeds via the NO branch at (316).

Baselining unit 110 may determine whether feedback is available (320). For example, a human analyst or a system analyst may review, investigate, or determine whether one or more of the alerts output at (318) are a true positive, a false positive, and whether there are any false negatives. In some examples, baselining unit 110 may determine whether feedback is available during the second time period (e.g., (312)-(320) may occur during the second period of time). In some examples, baselining unit 110 may determine whether feedback is available after the second time period.

Returning to the example of FIG. 4, an analyst (human or otherwise) may determine that second actual event metric value A is classified incorrectly, e.g., is a false positive and is not indicative of a potential cyber security threat. In other examples, the analyst may determine that second actual event metric value A is classified correctly, e.g., is a true positive. The analyst may provide the feedback to cyber security system 108, or cyber security system may obtain, the feedback. Baselining unit 110 may determine that feedback is available (the YES branch at (320)), and obtain the feedback.

Baselining unit 110 may adjust and/or determine the accuracy weight value (w1), precision weight value (w2), and range weight value (w3) (322). For example, baselining unit 110 may dynamically adjust and/or optimize the weights w1, w2, w3 of equation (4) to find the best possible combination of weights, e.g., such that the overall accuracy for the model is improved and/or maximized. In some examples, baselining unit 110 may determine a plurality of F-scores, each F-score corresponding to each of forecasting model of the plurality of forecasting models, based on the feedback. For example, an F-score may be calculated from a positive predictive value and a sensitivity, where the positive predictive value is the number of true positive results divided by the number of all positive results, including those not identified correctly, and the sensitivity is the number of true positive results divided by the number of all samples that should have been identified as positive. In some examples, baselining unit 110 may determine the plurality of F-scores for a plurality of values of each of the accuracy weight value (w1), the precision weight value (w2), and the range weight value (w3), and determine a weighting combination of the accuracy weight value (w1), the precision weight value (w2), and the range weight value (w3) having the maximum F-score. In some examples, in lieu of or in addition to F-score, baselining unit 110 may determine one or more other classification measures, e.g., Jaccard Index, False Discovery Rate (FDR), False Negative Rate (FNR) or various other calculations or combinations of calculations, e.g., derived from a confusion matrix, or the like.

For example, baselining unit 110 may determine and/or adjust the accuracy weight value (w1), the precision weight value (w2), and the range weight value (w3) according to a procedure indicated by the pseudocode below. In the pseudocode below, B denotes the positive alerts and negative alert (e.g., non-alerts) for the most recent N time points (e.g., portions of time within the second period of time). Each of the plurality of forecasting models' predictions (e.g., predicted event metric value and range) are denoted as P (e.g., P1, P2, P3, . . . , Pk, for k different forecasting models and/or k different forecasts). The feedback is denoted as F, and F and B are compared to determine the actual (true) positives and negative alerts, denoted as T below.

Step 1:
Compare with B and F, to derive actual positives and negatives, denoted as T Step 2:

```
{For w1 from 0 to 1, step by 0.01 do;
   {For w2 from 0 to 1, step by 0.01 do;
      {w3 = 1 - w1 - w2
      if w3 ≥ 0;
         {for j = 1 to N do;
            {for i = 1to k do;
               calculate MRMEij with Pi;
            end do;}
         select a best model P at j based on the minimum MRMEij;
         compare model predicted positive alerts and negatives (non-alerts) with T
at j, record whether it's true positive (tp), false positive (fp) or false negative (fn);
         end do;}
      calculate F1 score based on number of tp, fp, fn and N for this weighting
combination;
         endif;}
      end do;}
   end do;}
Step 3:
   Choose the weighting combination with the largest F1 score
```

Baselining unit 110 optionally determines and/or adjusts the actual event metric value A based on the second plurality of events, first plurality of events, other historical events, or other information (e.g., such as known causes that may change the event metric, such as a holiday or weekend/weekday that may change the expected number and/or rate of emails being sent or received by computing devices 104) (324). The method may then return to any of (306)-(308) and proceed for third and/or any other subsequent periods of time.

In the example of FIG. 4, after adjusting accuracy weight value (w1), precision weight value (w2), and range weight value (w3), the method may return to (306) and baselining unit 110 determines a plurality of MRME selection criterion values corresponding to each of the forecasting models' predictions example, based on the adjusted weights w1, w2, w3. At (308), baselining unit 110 may determine the MRME value of the second forecasting model of FIG. 4 to be the least, and select the second forecasting unit at (308). Second forecasting unit (e.g., predicting P2, U2, L2, may reduce any or all of false negatives and false positives, and increase true positives. In the example shown, second actual event metric value A would not trigger an alert because A is within control limits U2, L2, effectively changing from an alert-generating false positive to true negative relative to the first forecasting model.

FIG. 5 is a conceptual plot illustrating a plurality of events and predicted event metric values over a plurality of periods of time illustrating cyber security baselining in accordance with one or more aspects of this disclosure. In the example shown, a plot of the actual event metric values, e.g., plot 504 which may be a total number of emails sent or received by computing devices 104 per time period, is plotted overlaid with plots of several predicted event metric values per time period (e.g., emails per time) predicted by several forecasting models, including predicted plot 502 of a particular forecasting model. In the example shown, the plots are plotted over about 19 days, with the 13 "peaks" corresponding to weekdays and 6 weekend days corresponding to the low number of emails before the first set of five peaks, between the first and second set of five peaks, and after the second set of five peaks. The low number of emails between the peaks corresponds to evening and/or night hours, e.g., non-work hours. In the example shown, the period of time may be about one hour. In the example shown, the number of emails is substantially cyclical, with a higher number during work hours, e.g., on workdays during work hours.

In the example shown, D1 corresponds to a holiday or non-workday, e.g., the Monday after the July $4^{th}$ in the United States, July $5^{th}$ in this case, which is a national holiday and non-workday for a substantially number of people and organizations. D2 may correspond to the following Monday, e.g., workday (e.g., non-holiday). In the example shown, at D1 the actual number of emails is reduced significantly relative to a typical Monday, and then returns to a "normal" amount at D2, the following Monday, as illustrated by actual plot 504. Some of the forecasting models successfully predict the non-cyclic behavior, however, the forecasting model generating predicted plot 502 does not (e.g., forecasting model 502). As such, a method and/or system that selects forecasting model 502 to provide baselining may generate a significant amount of false alerts, e.g., any or all of false positives and false negatives, and may generate relatively few true alerts, e.g., true positives and true negatives at both D1 and D2. In some examples, forecasting model 502, at times other than D1 and D2, may be the best model, e.g., generate any or all of the fewest false alerts and most true alerts.

In accordance with the techniques described herein and with reference to FIG. 3, baselining unit 110 may dynamically select the "best" forecasting model, e.g., time period by time period, or hour by hour in the example of FIG. 5, based on the MRME. For example, baselining unit 110 may select forecasting model 502 to provide baselining for 34 out of the 48 hours at days D3 and D4 (e.g., Sunday and Monday of the week before the holiday), zero times at days D5 and D1 (the Sunday and Monday of the holiday), and again 34 out of the 48 hours at days D6 and D2 (the Sunday and Monday the week after the holiday). In other words, in the example shown using the techniques described herein guided by the MRME selection criterion, a baselining system may automatically switch to more trending focused predictions and/or forecasting, e.g., on July 5th and changed back to its usual selection behavior on July 12th.

The following is a non-limiting list of examples that are in accordance with one or more techniques of this disclosure.

Example 1: A method including: predicting, by a computing system and based on a first forecasting model and previous to a first period of time, a first predicted event metric value and a first predicted event metric value range of at least one event metric corresponding to a first plurality of events to occur over the first period of time; predicting, by the computing system and based on a second forecasting model and previous to the first period of time, a second predicted event metric value and a second predicted event metric value range of the at least one event metric corresponding to the first plurality of events to occur over the first period of time; obtaining, by the computing system, the first plurality of events over the first period of time; determining, by the computing system and based on the first plurality of events, a first actual event metric value of at least one event metric corresponding to the first plurality of events; determining, by the computing system, a first model range multi-partition error (MRME) value based on the first actual event metric value, the first predicted event metric value, and the first predicted event metric value range, wherein the first MRME value is indicative of an accuracy, precision, and relative range of the first forecasting model; determining, by the computing system, a second MRME value based on the first actual event metric value, the second predicted event metric value, and the second predicted event metric value range, wherein the second MRME value is indicative of an accuracy, precision, and relative range of the second forecasting model; selecting, by the computing system and based on the first and second MRME values, one of the first or second forecasting models to be a selected forecasting model, wherein a selected predicted event metric value is whichever of the first or second predicted event metric value that was predicted by the selected forecasting model, wherein a selected predicted event metric range is whichever of the first or second predicted event metric value range that was predicted by the selected forecasting model; determining, by the computing system, a cyber security control limit based on at least one of the selected predicted event metric value or the selected predicted event metric range; and outputting, by the computing system, a first alert based on the first actual event metric value being outside of the cyber security control limit.

Example 2: The method of example 1, further including: determining, by the computing system and based on a sum of a weighted prediction accuracy of the first predicted event metric value, a weighted prediction precision of the first predicted event metric value range, and a weighted prediction relative range indicative of a width of first predicted event metric value range, the first MRME value; and determining, by the computing system and based on a sum of a weighted prediction accuracy of the second predicted event metric value, a weighted prediction precision of the second predicted event metric value range, and a weighted prediction relative range indicative of a width of second predicted event metric value range, the second MRME value.

Example 3: The method of example 2, wherein the weighted prediction accuracy of the first predicted event metric value comprises a first absolute value of a difference between the first actual event metric value and the first predicted event metric value, the first absolute value of the difference multiplied by a first accuracy weight value and divided by a sum of one and the first actual event metric value, wherein the weighted prediction precision of the first predicted event metric value range comprises a first precision difference between the first predicted event metric value range and the first actual event metric value, the first precision difference multiplied by a first precision weight value and divided by a sum of one and the first actual event metric value, wherein the weighted prediction relative range comprises a first range difference between the first predicted event metric value range and the first predicted event metric value, the first range difference multiplied by a first range weight value and divided by a sum of one and the first predicted event metric value, wherein the weighted prediction accuracy of the second predicted event metric value comprises a second absolute value of a difference between the first actual event metric value and the second predicted event metric value, the second absolute value of the difference multiplied by the first accuracy weight value and divided by a sum of one and the first actual event metric, wherein the weighted prediction precision of the second predicted event metric value range comprises a second precision difference between the second predicted event metric value range and the first actual event metric value, the second precision difference multiplied by the first precision weight value and divided by a sum of one and the first actual event metric, and wherein the weighted prediction relative range comprises a second range difference between the second predicted event metric value range and the predicted event metric value, the second range difference multiplied by the first range weight value and divided by a sum of one and the second predicted event metric.

Example 4: The method of example 3, wherein the first accuracy weight value, the first precision weight value, and the first range weight value are the same.

Example 5: The method of examples 3 or example 4, further including: obtaining, by the computing system, the second plurality of events over a second period of time; determining, by the computing system and based on the second plurality of events, a second actual event metric value of at least one event metric corresponding to the second plurality of events; outputting, by the computing system, a second alert based on the second actual event metric value being outside of the cyber security control limit; and receiving, by the computing system, feedback related to at least one of the second plurality of events over the second time period or the second alert, wherein the feedback comprises a first true positive events value, a first false positive events value, and a first false negative events value corresponding to the first forecasting model, and wherein the feedback comprises a second true positive events value, a second false positive events value, and a second false negative events value corresponding to the second forecasting model.

Example 6: The method of example 5 further including: determining, by the computing system and based on the received feedback, a first F-score corresponding to the first forecasting model and a second F-score corresponding to the second forecasting model; and determining, by the computing system and based on the first F-score and the second F-score, a second accuracy weight value, a second precision weight value, and a second range weight value; predicting, by the computing system and based on the first forecasting model, a third predicted event metric value and a third predicted event metric value range of the at least one metric corresponding to a third plurality of events over a third time period that is subsequent to the second time period; predicting, by the computing system and based on a second forecasting model, a fourth predicted event metric value and a fourth predicted event metric value range of the at least one metric corresponding to the third plurality of events over the third time period that is subsequent to the second time period; determining, by the computing system and based on the second actual event metric value, the third predicted event metric value, the second accuracy weight value, the second precision weight value, and the second range weight value, a third MRME value; determining, by the computing system and based on the second actual event metric value, the fourth predicted event metric value, the second accuracy weight value, the second precision weight value, and the second range weight value, a fourth MRME value; and selecting, by the computing system and based on the third and fourth MRME values, one of the first or second forecasting models.

Example 7: The method of example 6, wherein the second accuracy weight value, the second precision weight value, and the second range weight value are not the same.

Example 8: The method of any one of examples 1 through 7, wherein the events of the first plurality of events and the second plurality of events comprise cyber security events.

Example 9: A computing system including: a communication unit configured to obtain a plurality of events; and one or more processors implemented in circuitry and in communication with the communication unit, the one or more processors configured to: predict, based on a first forecasting model and previous to a first period of time, a first predicted event metric value and a first predicted event metric value range of at least one event metric corresponding to a first plurality of events to occur over the first period of time; predict, based on a second forecasting model and previous to the first period of time, a second predicted event metric value and a second predicted event metric value range of the at least one event metric corresponding to the first plurality of events to occur over the first period of time; obtain the first plurality of events over the first period of time; determine, based on the first plurality of events, a first actual event metric value of at least one event metric corresponding to the first plurality of events; determine a first model range multi-partition error (MRME) value based on the first actual event metric value, the first predicted event metric value, and the first predicted event metric value range, wherein the first MRME value is indicative of an accuracy, precision, and relative range of the first forecasting model; determine a second MRME value based on the first actual event metric value, the second predicted event metric value, and the second predicted event metric value range, wherein the second MRME value is indicative of an accuracy, precision, and relative range of the second forecasting model; select based on the first and second MRME values, one of the first or second forecasting models to be a selected forecasting model, wherein a selected predicted event metric value is whichever of the first or second predicted event metric value that was predicted by the selected forecasting model, wherein a selected predicted event metric range is whichever of the first or second predicted event metric range that was predicted by the selected forecasting model; determine a cyber security control limit based on at least one of the selected predicted event metric value or the selected predicted event metric range; and output a first alert based on the first actual event metric value being outside of the cyber security control limit.

Example 10: The computing system of example 9, wherein the one or more processors are further configured to: determine, based on a sum of a weighted prediction accuracy of the first predicted event metric value, a weighted prediction precision of the first predicted event metric value range, and a weighted prediction relative range indicative of a width of first predicted event metric value range, the first MRME value; and determine, based on a sum of a weighted prediction accuracy of the second predicted event metric value, a weighted prediction precision of the second predicted event metric value range, and a weighted prediction relative range indicative of a width of second predicted event metric value range, the second MRME value.

Example 11: The computing system of example 10, wherein the weighted prediction accuracy of the first predicted event metric value comprises a first absolute value of a difference between the first actual event metric value and the first predicted event metric value, the first absolute value of the difference multiplied by a first accuracy weight value and divided by a sum of one and the first actual event metric value, wherein the weighted prediction precision of the first predicted event metric value range comprises a first precision difference between the first predicted event metric value range and the first actual event metric value, the first precision difference multiplied by a first precision weight value and divided by a sum of one and the first actual event metric value, wherein the weighted prediction relative range comprises a first range difference between the first predicted event metric value range and the first predicted event metric value, the first range difference multiplied by a first range weight value and divided by a sum of one and the first predicted event metric value, wherein the weighted prediction accuracy of the second predicted event metric value comprises a second absolute value of a difference between the first actual event metric value and the second predicted event metric value, the second absolute value of the difference multiplied by the first accuracy weight value and divided by a sum of one and the first actual event metric, wherein the weighted prediction precision of the second predicted event metric value range comprises a second precision difference between the second predicted event metric value range and the first actual event metric value, the second precision difference multiplied by the first precision weight value and divided by a sum of one and the first actual event metric, and wherein the weighted prediction relative range comprises a second range difference between the second predicted event metric value range and the predicted event metric value, the second range difference multiplied by the first range weight value and divided by a sum of one and the second predicted event metric.

Example 12: The computing system of example 11, wherein the first accuracy weight value, the first precision weight value, and the first range weight value are the same.

Example 13: The computing system of example 11 or examples 12, wherein the one or more processors are further configured to: obtain the second plurality of events over a second period of time; determine, based on the second plurality of events, a second actual event metric value of at least one event metric corresponding to the second plurality of events; output a second alert based on the second actual event metric value being outside of the cyber security control limit; and receive feedback related to at least one of the second plurality of events over the second time period or the second alert, wherein the feedback comprises a first true positive events value, a first false positive events value, and a first false negative events value corresponding to the first forecasting model, and wherein the feedback comprises a second true positive events value, a second false positive events value, and a second false negative events value corresponding to the second forecasting model.

Example 14: The computing system of example 13, wherein the one or more processors are further configured to: determine, based on the received feedback, a first F-score corresponding to the first forecasting model and a second F-score corresponding to the second forecasting model; determining, by the computing system and based on the first F-score and the second F-score, a second accuracy weight value, a second precision weight value, and a second range weight value; predict, based on the first forecasting model, a third predicted event metric value and a third predicted event metric value range of the at least one metric corresponding to a third plurality of events over a third time period that is subsequent to the second time period; predict, based on a second forecasting model, a fourth predicted event metric value and a fourth predicted event metric value range of the at least one metric corresponding to the third plurality of events over the third time period that is subsequent to the second time period; determine, based on the second actual event metric value, the third predicted event metric value, the second accuracy weight value, the second precision weight value, and the second range weight value, a third MRME value; determine, based on the second actual event metric value, the fourth predicted event metric value, the second accuracy weight value, the second precision weight value, and the second range weight value, a fourth MRME value; and select, based on the third and fourth MRME values, one of the first or second forecasting models.

Example 15: The computing system of example 14, wherein the second accuracy weight value, the second precision weight value, and the second range weight value are not the same.

Example 16: The computing system of any one of examples 9 through 15, wherein the events of the first plurality of events and the second plurality of events comprise cyber security events.

Example 17: A non-transitory computer-readable medium having instructions stored thereon that, when executed, cause one or more processors to: predict, based on a first forecasting model and previous to a first period of time, a first predicted event metric value and a first predicted event metric value range of at least one event metric corresponding to a first plurality of events to occur over the first period of time; predict, based on a second forecasting model and previous to the first period of time, a second predicted event metric value and a second predicted event metric value range of the at least one event metric corresponding to the first plurality of events to occur over the first period of time; obtain the first plurality of events over the first period of time; determine, based on the first plurality of events, a first actual event metric value of at least one event metric corresponding to the first plurality of events; determine a first model range multi-partition error (MRME) value based on the first actual event metric value, the first predicted event metric value, and the first predicted event metric value range, wherein the first MRME value is indicative of an accuracy, precision, and relative range of the first forecasting model; determine a second MRME value based on the first actual event metric value, the second predicted event metric value, and the second predicted event metric value range, wherein the second MRME value is indicative of an accuracy, precision, and relative range of the second forecasting model; select based on the first and second MRME values, one of the first or second forecasting models to be a selected forecasting model, wherein a selected predicted event metric value is whichever of the first or second predicted event metric value that was predicted by the selected forecasting model, wherein a selected predicted event metric range is whichever of the first or second predicted event metric range that was predicted by the selected forecasting model; determine a cyber security control limit based on at least one of the selected predicted event metric value or the selected predicted event metric range; and output a first alert based on the first actual event metric value being outside of the cyber security control limit.

Example 18: The non-transitory computer-readable medium of example 17 having further instructions stored thereon that, when executed, cause one or more processors to: determine, based on a sum of a weighted prediction accuracy of the first predicted event metric value, a weighted prediction precision of the first predicted event metric value range, and a weighted prediction relative range indicative of a width of first predicted event metric value range, the first MRME value; and determine, based on a sum of a weighted prediction accuracy of the second predicted event metric value, a weighted prediction precision of the second predicted event metric value range, and a weighted prediction relative range indicative of a width of second predicted event metric value range, the second MRME value.

Example 19: The non-transitory computer-readable medium of example 18 having further instructions stored thereon that, when executed, cause one or more processors to: obtain the second plurality of events over a second period of time; determine, based on the second plurality of events, a second actual event metric value of at least one event metric corresponding to the second plurality of events; output a second alert based on the second actual event metric value being outside of the cyber security control limit; and receive feedback related to at least one of the second plurality of events over the second time period or the second alert, wherein the feedback comprises a first true positive events value, a first false positive events value, and a first false negative events value corresponding to the first forecasting model, and wherein the feedback comprises a second true positive events value, a second false positive events value, and a second false negative events value corresponding to the second forecasting model.

Example 20: The method of any one of examples 17 through 19, wherein the events of the first plurality of events and the second plurality of events comprise cyber security events.

For processes, apparatuses, and other examples or illustrations described herein, including in any flowcharts or flow diagrams, certain operations, acts, steps, or events included in any of the techniques described herein can be performed in a different sequence, may be added, merged, or left out altogether (e.g., not all described acts or events are necessary for the practice of the techniques). Moreover, in certain examples, operations, acts, steps, or events may be performed concurrently, e.g., through multi-threaded processing, interrupt processing, or multiple processors, rather than sequentially. Further certain operations, acts, steps, or events may be performed automatically even if not specifically identified as being performed automatically. Also, certain operations, acts, steps, or events described as being performed automatically may be alternatively not performed automatically, but rather, such operations, acts, steps, or events may be, in some examples, performed in response to input or another event.

Further, certain operations, techniques, features, and/or functions may be described herein as being performed by specific components, devices, and/or modules. In other examples, such operations, techniques, features, and/or functions may be performed by different components, devices, or modules. Accordingly, some operations, techniques, features, and/or functions that may be described herein as being attributed to one or more components, devices, or modules may, in other examples, be attributed to other components, devices, and/or modules, even if not specifically described herein in such a manner.

In one or more examples, the functions described may be implemented in hardware, software, firmware, or any combination thereof. If implemented in software, the functions may be stored on or transmitted over a computer-readable medium as one or more instructions or code and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers, processing circuitry, or one or more processors to retrieve instructions, code and/or data structures for implementation of the techniques described in this disclosure. A computer program product may include a computer-readable medium.

By way of example, and not limitation, such computer-readable storage media can include RAM, ROM, EEPROM, CD-ROM, or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), and Blu-ray disc, where disks usually reproduce data magnetically, while discs reproduce data optically with lasers. Combinations of the above should also be included within the scope of computer-readable media.

Instructions may be executed by processing circuitry (e.g., one or more processors, such as one or more DSPs, general purpose microprocessors, ASICs, FPGAs, or other equivalent integrated or discrete logic circuitry), as well as any combination of such components. Accordingly, the term "processor" or "processing circuitry" as used herein, may refer to any of the foregoing structures or any other structure suitable for implementation of the techniques described herein. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including a wireless communication device or wireless handset, a microprocessor, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

What is claimed is:

1. A computer-implemented method comprising:
    predicting, by one or more processors of a computing system and based on a first forecasting model and previous to a first period of time, a first predicted event metric value and a first predicted event metric value range of at least one event metric corresponding to a first plurality of events to occur over the first period of time;
    predicting, by the one or more processors and based on a second forecasting model and previous to the first period of time, a second predicted event metric value and a second predicted event metric value range of the at least one event metric corresponding to the first plurality of events to occur over the first period of time;
    obtaining, by the one or more processors, the first plurality of events over the first period of time;
    determining, by the one or more processors and based on the first plurality of events, a first actual event metric value of at least one event metric corresponding to the first plurality of events;
    determining, by the one or more processors, a first model range multi-partition error (MRME) value based on the first actual event metric value, the first predicted event metric value, and the first predicted event metric value range, wherein the first MRME value is indicative of an accuracy, precision, and relative range of the first forecasting model;
    determining, by the one or more processors, a second MRME value based on the first actual event metric value, the second predicted event metric value, and the second predicted event metric value range, wherein the second MRME value is indicative of an accuracy, precision, and relative range of the second forecasting model;
    selecting, by the one or more processors and based on the first and second MRME values, one of the first or second forecasting models to be a selected forecasting model, wherein a selected predicted event metric value is whichever of the first or second predicted event metric value that was predicted by the selected forecasting model, wherein a selected predicted event metric range is whichever of the first or second predicted event metric value range that was predicted by the selected forecasting model;
    determining, by the one or more processors, a cyber security control limit based on at least one of the selected predicted event metric value or the selected predicted event metric range; and
    outputting, by the one or more processors, a first alert based on the first actual event metric value being outside of the cyber security control limit.

2. The computer-implemented method of claim 1, further comprising:
    determining, by the one or more processors and based on a sum of a weighted prediction accuracy of the first predicted event metric value, a weighted prediction precision of the first predicted event metric value range, and a weighted prediction relative range indicative of a width of the first predicted event metric value range, the first MRME value; and
    determining, by the one or more processors and based on a sum of a weighted prediction accuracy of the second predicted event metric value, a weighted prediction precision of the second predicted event metric value range, and a weighted prediction relative range indicative of a width of second predicted event metric value range, the second MRME value.

3. The computer-implemented method of claim 2, wherein the weighted prediction accuracy of the first predicted event metric value comprises a first absolute value of a difference between the first actual event metric value and the first predicted event metric value, the first absolute value of the difference multiplied by a first accuracy weight value and divided by a sum of one and the first actual event metric value,
    wherein the weighted prediction precision of the first predicted event metric value range comprises a first precision difference between the first predicted event metric value range and the first actual event metric value, the first precision difference multiplied by a first precision weight value and divided by a sum of one and the first actual event metric value,
    wherein the weighted prediction relative range comprises a first range difference between the first predicted event metric value range and the first predicted event metric value, the first range difference multiplied by a first range weight value and divided by a sum of one and the first predicted event metric value,
    wherein the weighted prediction accuracy of the second predicted event metric value comprises a second absolute value of a difference between the first actual event metric value and the second predicted event metric value, the second absolute value of the difference multiplied by the first accuracy weight value and divided by a sum of one and the first actual event metric value,
    wherein the weighted prediction precision of the second predicted event metric value range comprises a second precision difference between the second predicted event metric value range and the first actual event metric value, the second precision difference multiplied by the first precision weight value and divided by a sum of one and the first actual event metric value, and
    wherein the weighted prediction relative range comprises a second range difference between the second predicted event metric value range and the first predicted event metric value, the second range difference multiplied by the first range weight value and divided by a sum of one and the second predicted event metric value.

4. The computer-implemented method of claim 3, wherein the first accuracy weight value, the first precision weight value, and the first range weight value are the same.

5. The computer-implemented method of claim 3, further comprising:
    obtaining, by the one or more processors, a second plurality of events over a second period of time;
    determining, by the one or more processors and based on the second plurality of events, a second actual event metric value of at least one event metric corresponding to the second plurality of events;
    outputting, by the one or more processors, a second alert based on the second actual event metric value being outside of the cyber security control limit; and
    receiving, by the one or more processors, feedback related to at least one of the second plurality of events over the second period of time or the second alert,
    wherein the feedback comprises a first true positive events value, a first false positive events value, and a first false negative events value corresponding to the first forecasting model, and
    wherein the feedback comprises a second true positive events value, a second false positive events value, and a second false negative events value corresponding to the second forecasting model.

6. The computer-implemented method of claim 5 further comprising:
    determining, by the one or more processors and based on the received feedback, a first F-score corresponding to the first forecasting model and a second F-score corresponding to the second forecasting model; and
    determining, by the one or more processors and based on the first F-score and the second F-score, a second accuracy weight value, a second precision weight value, and a second range weight value;
    predicting, by the one or more processors and based on the first forecasting model, a third predicted event metric value and a third predicted event metric value range of the at least one metric corresponding to a third plurality of events over a third time period that is subsequent to the second time period;
    predicting, by the one or more processors and based on a second forecasting model, a fourth predicted event metric value and a fourth predicted event metric value range of the at least one metric corresponding to the third plurality of events over the third time period;
    determining, by the one or more processors and based on the second actual event metric value, the third predicted event metric value, the second accuracy weight value, the second precision weight value, and the second range weight value, a third MRME value;
    determining, by the one or more processors and based on the second actual event metric value, the fourth predicted event metric value, the second accuracy weight value, the second precision weight value, and the second range weight value, a fourth MRME value; and
    selecting, by the one or more processors and based on the third and fourth MRME values, one of the first or second forecasting models.

7. The computer-implemented method of claim 6, wherein the second accuracy weight value, the second precision weight value, and the second range weight value are not the same.

8. The computer-implemented method of claim 5, wherein the events of the first plurality of events and the second plurality of events comprise cyber security events.

9. A computing system comprising:
    a communication unit configured to obtain a plurality of events; and
    one or more processors implemented in circuitry and in communication with the communication unit, the one or more processors configured to:
        predict, based on a first forecasting model and previous to a first period of time, a first predicted event metric value and a first predicted event metric value range of at least one event metric corresponding to a first plurality of events to occur over the first period of time;
        predict, based on a second forecasting model and previous to the first period of time, a second predicted event metric value and a second predicted event metric value range of the at least one event metric corresponding to the first plurality of events to occur over the first period of time;
        obtain the first plurality of events over the first period of time;
        determine, based on the first plurality of events, a first actual event metric value of at least one event metric corresponding to the first plurality of events;
        determine a first model range multi-partition error (MRME) value based on the first actual event metric value, the first predicted event metric value, and the first predicted event metric value range, wherein the first MRME value is indicative of an accuracy, precision, and relative range of the first forecasting model;

determine a second MRME value based on the first actual event metric value, the second predicted event metric value, and the second predicted event metric value range, wherein the second MRME value is indicative of an accuracy, precision, and relative range of the second forecasting model;

select based on the first and second MRME values, one of the first or second forecasting models to be a selected forecasting model, wherein a selected predicted event metric value is whichever of the first or second predicted event metric value that was predicted by the selected forecasting model, wherein a selected predicted event metric range is whichever of the first or second predicted event metric value range that was predicted by the selected forecasting model;

determine a cyber security control limit based on at least one of the selected predicted event metric value or the selected predicted event metric range; and output a first alert based on the first actual event metric value being outside of the cyber security control limit.

10. The computing system of claim 9, wherein the one or more processors are further configured to:

determine, based on a sum of a weighted prediction accuracy of the first predicted event metric value, a weighted prediction precision of the first predicted event metric value range, and a weighted prediction relative range indicative of a width of the first predicted event metric value range, the first MRME value; and determine, based on a sum of a weighted prediction accuracy of the second predicted event metric value, a weighted prediction precision of the second predicted event metric value range, and a weighted prediction relative range indicative of a width of second predicted event metric value range, the second MRME value.

11. The computing system of claim 10, wherein the weighted prediction accuracy of the first predicted event metric value comprises a first absolute value of a difference between the first actual event metric value and the first predicted event metric value, the first absolute value of the difference multiplied by a first accuracy weight value and divided by a sum of one and the first actual event metric value, wherein the weighted prediction precision of the first predicted event metric value range comprises a first precision difference between the first predicted event metric value range and the first actual event metric value, the first precision difference multiplied by a first precision weight value and divided by a sum of one and the first actual event metric value, wherein the weighted prediction relative range comprises a first range difference between the first predicted event metric value range and the first predicted event metric value, the first range difference multiplied by a first range weight value and divided by a sum of one and the first predicted event metric value, wherein the weighted prediction accuracy of the second predicted event metric value comprises a second absolute value of a difference between the first actual event metric value and the second predicted event metric value, the second absolute value of the difference multiplied by the first accuracy weight value and divided by a sum of one and the first actual event metric value, wherein the weighted prediction precision of the second predicted event metric value range comprises a second precision difference between the second predicted event metric value range and the first actual event metric value, the second precision difference multiplied by the first precision weight value and divided by a sum of one and the first actual event metric value, and wherein the weighted prediction relative range comprises a second range difference between the second predicted event metric value range and the first predicted event metric value, the second range difference multiplied by the first range weight value and divided by a sum of one and the second predicted event metric value.

12. The computing system of claim 11, wherein the first accuracy weight value, the first precision weight value, and the first range weight value are the same.

13. The computing system of claim 11, wherein the one or more processors are further configured to:

obtain a second plurality of events over a second period of time;

determine, based on the second plurality of events, a second actual event metric value of at least one event metric corresponding to the second plurality of events;

output a second alert based on the second actual event metric value being outside of the cyber security control limit; and receive feedback related to at least one of the second plurality of events over the second period of time or the second alert, wherein the feedback comprises a first true positive events value, a first false positive events value, and a first false negative events value corresponding to the first forecasting model, and wherein the feedback comprises a second true positive events value, a second false positive events value, and a second false negative events value corresponding to the second forecasting model.

14. The computing system of claim 13, wherein the one or more processors are further configured to:

determine, based on the received feedback, a first F-score corresponding to the first forecasting model and a second F-score corresponding to the second forecasting model;

determining, by the computing system and based on the first F-score and the second F-score, a second accuracy weight value, a second precision weight value, and a second range weight value;

predict, based on the first forecasting model, a third predicted event metric value and a third predicted event metric value range of the at least one metric corresponding to a third plurality of events over a third time period that is subsequent to the second period of time;

predict, based on a second forecasting model, a fourth predicted event metric value and a fourth predicted event metric value range of the at least one metric corresponding to the third plurality of events over the third time period;

determine, based on the second actual event metric value, the third predicted event metric value, the second accuracy weight value, the second precision weight value, and the second range weight value, a third MRME value;

determine, based on the second actual event metric value, the fourth predicted event metric value, the second accuracy weight value, the second precision weight value, and the second range weight value, a fourth MRME value; and select, based on the third and fourth MRME values, one of the first or second forecasting models.

15. The computing system of claim 14, wherein the second accuracy weight value, the second precision weight value, and the second range weight value are not the same.

16. The computing system of claim 13, wherein the events of the first plurality of events and the second plurality of events comprise cyber security events.

17. One or more non-transitory computer-readable media having instructions stored thereon that, when executed, cause one or more processors to:

predict, based on a first forecasting model and previous to a first period of time, a first predicted event metric value and a first predicted event metric value range of at least one event metric corresponding to a first plurality of events to occur over the first period of time;

predict, based on a second forecasting model and previous to the first period of time, a second predicted event metric value and a second predicted event metric value range of the at least one event metric corresponding to the first plurality of events to occur over the first period of time;

obtain the first plurality of events over the first period of time;

determine, based on the first plurality of events, a first actual event metric value of at least one event metric corresponding to the first plurality of events;

determine a first model range multi-partition error (MRME) value based on the first actual event metric value, the first predicted event metric value, and the first predicted event metric value range, wherein the first MRME value is indicative of an accuracy, precision, and relative range of the first forecasting model;

determine a second MRME value based on the first actual event metric value, the second predicted event metric value, and the second predicted event metric value range, wherein the second MRME value is indicative of an accuracy, precision, and relative range of the second forecasting model;

select based on the first and second MRME values, one of the first or second forecasting models to be a selected forecasting model, wherein a selected predicted event metric value is whichever of the first or second predicted event metric value that was predicted by the selected forecasting model, wherein a selected predicted event metric range is whichever of the first or second predicted event metric value range that was predicted by the selected forecasting model;

determine a cyber security control limit based on at least one of the selected predicted event metric value or the selected predicted event metric range; and output a first alert based on the first actual event metric value being outside of the cyber security control limit.

18. The one or more non-transitory computer-readable media of claim 17 having further instructions stored thereon that, when executed, cause the one or more processors to:

determine, based on a sum of a weighted prediction accuracy of the first predicted event metric value, a weighted prediction precision of the first predicted event metric value range, and a weighted prediction relative range indicative of a width of first predicted event metric value range, the first MRME value; and determine, based on a sum of a weighted prediction accuracy of the second predicted event metric value, a weighted prediction precision of the second predicted event metric value range, and a weighted prediction relative range indicative of a width of second predicted event metric value range, the second MRME value.

19. The one or more non-transitory computer-readable media of claim 18 having further instructions stored thereon that, when executed, cause the one or more processors to:

obtain a second plurality of events over a second period of time;

determine, based on the second plurality of events, a second actual event metric value of at least one event metric corresponding to the second plurality of events;

output a second alert based on the second actual event metric value being outside of the cyber security control limit; and receive feedback related to at least one of the second plurality of events over the second period of time or the second alert, wherein the feedback comprises a first true positive events value, a first false positive events value, and a first false negative events value corresponding to the first forecasting model, and wherein the feedback comprises a second true positive events value, a second false positive events value, and a second false negative events value corresponding to the second forecasting model.

20. The one or more non-transitory computer-readable media of claim 19, wherein the events of the first plurality of events and the second plurality of events comprise cyber security events.

* * * * *